United States Patent
Nakai

[19]

[11] Patent Number: 6,061,183
[45] Date of Patent: May 9, 2000

[54] COLLIMATOR LENS AND LIGHT-SCANNING APPARATUS USING THE SAME

[75] Inventor: Yoko Nakai, Omiya, Japan

[73] Assignee: Fuji Photo Optical Co., Ltd., Saitama, Japan

[21] Appl. No.: 09/280,814

[22] Filed: Mar. 30, 1999

[30] Foreign Application Priority Data

Jun. 22, 1998 [JP] Japan .................................. 10-174198

[51] Int. Cl.[7] .................................................. G02B 27/30
[52] U.S. Cl. .......................... 359/641; 359/206; 359/666
[58] Field of Search .................................... 359/641, 206, 359/666

[56] References Cited

U.S. PATENT DOCUMENTS

| | | | |
|---|---|---|---|
| 5,270,851 | 12/1993 | Makino et al. | 359/206 |
| 5,633,736 | 5/1997 | Griffith | 359/17 |

FOREIGN PATENT DOCUMENTS

| | | | |
|---|---|---|---|
| 58-14109 | 1/1983 | Japan | G02B 9/04 |
| 58-38915 | 3/1983 | Japan | G02B 9/04 |
| 61-273520 | 5/1985 | Japan | G02B 27/30 |
| 61-279820 | 12/1986 | Japan | G02B 27/04 |
| 2-73324 | 3/1990 | Japan | G02B 27/30 |

*Primary Examiner*—Georgia Epps
*Assistant Examiner*—Tim Thompson
*Attorney, Agent, or Firm*—Snider & Associates; Ronald R. Snider

[57] ABSTRACT

Disclosed is a collimator lens adapted to secure required brightness and back focus and favorably correct off-axis aberrations while in a simple configuration, which is also applicable to a multi-beam scanning optical system. The collimator lens comprises, successively from a parallel luminous flux side, a first lens $L_1$ and a second lens $L_2$, each made of a positive meniscus lens having a convex surface directed onto the light source side, in which the surface of the first lens $L_1$ on the parallel luminous flux side is formed as an aspheric surface; while satisfying the following conditional expression (1):

$$-5.90 < R_1/f < -0.33 \quad (1)$$

where $R_1$ is the paraxial radius of curvature of the surface of the first lens $L_1$ on the parallel luminous flux side; and f is the focal length of the whole lens system.

6 Claims, 7 Drawing Sheets

EXAMPLE 1

EXAMPLE 2

NA 0.25
-0.2   0.2
SPHERICAL ABERRATION($\mu$m)

EXAMPLE 1

$\omega = 1.91°$
-0.2   0.2
ASTIGMATISM($\mu$m)

—— SAGITTAL
---- TANGENTIAL 0.002$\lambda$
WAVEFRONT ABERRATION($\omega = 0°$)

0.002$\lambda$
WAVEFRONT ABERRATION($\omega = 1.43°$)

0.002$\lambda$
WAVEFRONT ABERRATION($\omega = 1.43°$)

0.002$\lambda$
WAVEFRONT ABERRATION($\omega = 1.91°$)

0.002$\lambda$
WAVEFRONT ABERRATION($\omega = 1.91°$)

EXAMPLE 2
NA 0.30

SPHERICAL ABERRATION($\mu$m)

$\omega = 1.91°$

—— SAGITTAL
---- TANGENTIAL

ASTIGMATISM($\mu$m)

0.002$\lambda$

WAVEFRONT ABERRATION($\omega = 0°$)

0.002$\lambda$

WAVEFRONT ABERRATION($\omega = 1.43°$)

0.002$\lambda$

WAVEFRONT ABERRATION($\omega = 1.43°$)

0.002$\lambda$

WAVEFRONT ABERRATION($\omega = 1.91°$)

0.002$\lambda$

WAVEFRONT ABERRATION($\omega = 1.91°$)

FIG. 6A EXAMPLE 3 FIG. 6B
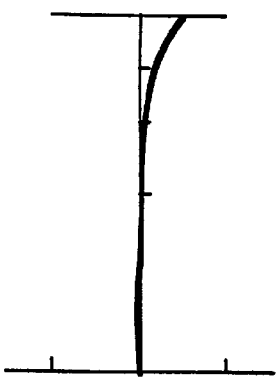
NA 0.30
SPHERICAL ABERRATION($\mu$m)
$\omega = 1.91°$
——— SAGITTAL
- - - - TANGENTIAL
ASTIGMATISM($\mu$m)
FIG. 6C-1
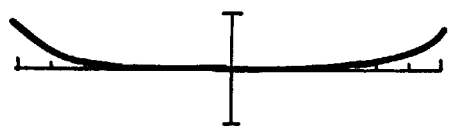
0.002$\lambda$
WAVEFRONT ABERRATION($\omega = 0°$)
FIG. 6C-2
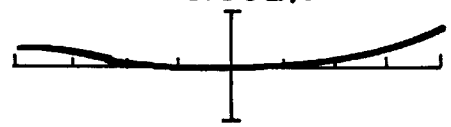
0.002$\lambda$
WAVEFRONT ABERRATION($\omega = 1.43°$)
FIG. 6C-3
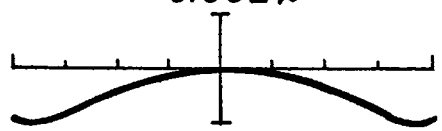
0.002$\lambda$
WAVEFRONT ABERRATION($\omega = 1.43°$)
FIG. 6C-4
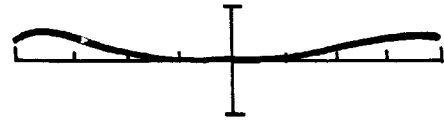
0.002$\lambda$
WAVEFRONT ABERRATION($\omega = 1.91°$)
FIG. 6C-5
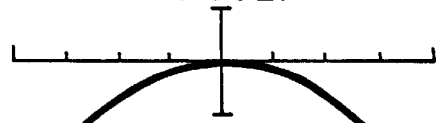
0.002$\lambda$
WAVEFRONT ABERRATION($\omega = 1.91°$)

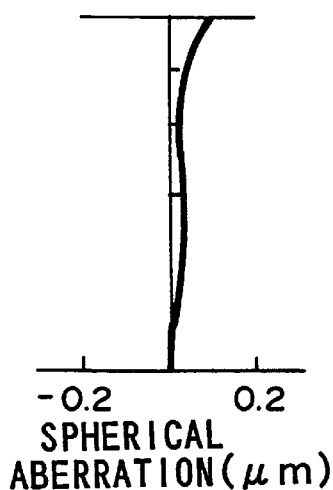
FIG.7A
NA 0.25
SPHERICAL ABERRATION($\mu$m)
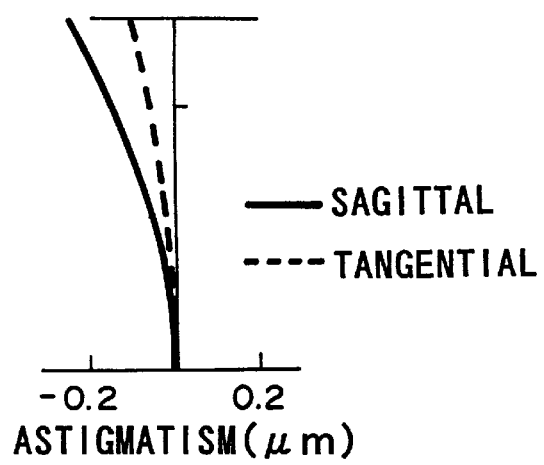
FIG.7B EXAMPLE 4 $\omega=1.91°$
ASTIGMATISM($\mu$m)
—— SAGITTAL
---- TANGENTIAL
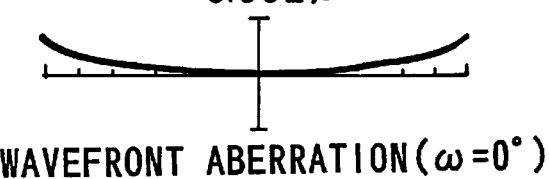
FIG.7C-1
0.002$\lambda$
WAVEFRONT ABERRATION($\omega=0°$)
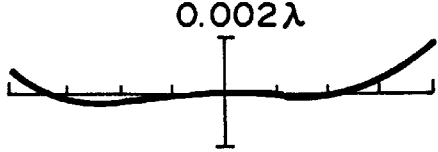
FIG.7C-2
0.002$\lambda$
WAVEFRONT ABERRATION($\omega=1.43°$)
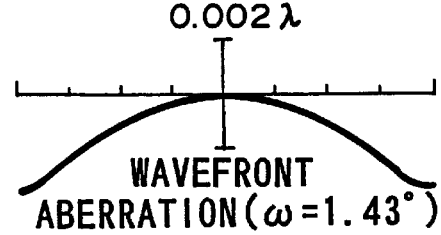
FIG.7C-3
0.002$\lambda$
WAVEFRONT ABERRATION($\omega=1.43°$)
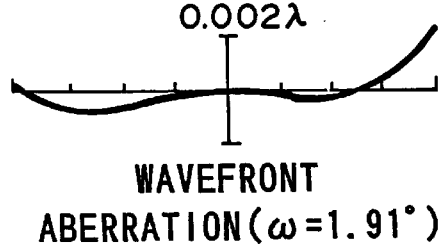
FIG.7C-4
0.002$\lambda$
WAVEFRONT ABERRATION($\omega=1.91°$)
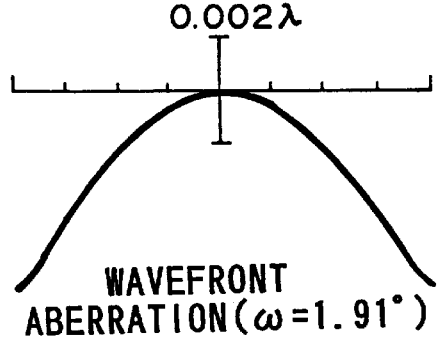
FIG.7C-5
0.002$\lambda$
WAVEFRONT ABERRATION($\omega=1.91°$)

NA 0.25 EXAMPLE 5

SPHERICAL ABERRATION($\mu$m)

$\omega = 1.91°$

—— SAGITTAL
---- TANGENTIAL

ASTIGMATISM($\mu$m)

WAVEFRONT ABERRATION($\omega = 0°$)

WAVEFRONT ABERRATION($\omega = 1.43°$)

WAVEFRONT ABERRATION($\omega = 1.43°$)

WAVEFRONT ABERRATION($\omega = 1.91°$)

WAVEFRONT ABERRATION($\omega = 1.91°$)

COLLIMATOR LENS AND LIGHT-SCANNING APPARATUS USING THE SAME

RELATED APPLICATIONS

This application claims the priority of Japanese Patent Application No. 10-174198 filed on Jun. 22, 1998, which is incorporated herein by reference.

BACKGROUND OF THE INVENTION

1. Field of the Invention

The present invention relates to a collimator lens used in a light-scanning apparatus for scanning a laser beam so as to record or display images, such as copier, laser printer, or the like; and, more specifically, to a collimator lens for converting a divergent luminous flux emitted from a light source such as semiconductor laser into a parallel luminous flux, and a light-scanning apparatus using the same.

2. Description of the Prior Art

There have conventionally been known various kinds of light-scanning apparatus for scanning a laser beam so as to record or display images, such as copier, laser printer, and the like.

Such a light-scanning apparatus is configured such that the laser beam emitted from a semiconductor laser is converted into a parallel luminous flux by a collimator lens, the resulting luminous flux is deflected in response to the rotation of a rotary polygon mirror, and thus deflected luminous flux is focused by an fθ lens onto an imaging surface.

Here, as disclosed in Japanese Unexamined Patent Publication Nos. 58-14109, 58-38915, 61-279820, 61-273520, and 2-73324, for example, a two-group, two-element collimator lens has been known, which aims at reducing the weight and dimensions of the lens.

It is necessary for such a collimator lens used in the light-scanning apparatus to be a bright lens system in order to enhance the efficiency of utilization of light from the light source and increase the illuminance on the photosensitive drum surface. As a consequence, the collimator lens generally has a larger aperture size as compared with the fθ lens system, thereby being likely to generate greater aberrations. Therefore, it is necessary for the collimator lens to favorably correct these aberrations such as wavefront aberration.

As the light-scanning apparatus, there has been known a multi-beam system in which a plurality of light sources are used for multi-beam scanning, thereby enabling higher scanning speed or simultaneous recording of different kinds of information by a single scanning operation. In such cases where this multi-beam system is used and the like, it is desirable that aberrations be favorably corrected within the range of about 2 degrees of half angle of view ω.

In the collimator lenses disclosed in the above-mentioned publications, however, examples having a narrow angle of view are prevailing, as evidenced by the fact that their performances with respect to off-axis light are only taken into consideration for an angle of view corresponding to the installation error, for instance. Their examples having a wide angle of view yield greater aberrations, thus being hard to be applied to a multi-beam scanning optical system in which a plurality of light sources are disposed on a plane perpendicular to the optical axis, for instance.

Further, in the collimator lenses disclosed in the above-mentioned publications, back focus, i.e., the distance from the light-source-side lens to the light source, is short, i.e., approximately 0.4 f to 0.6 f.

When back focus is short, the collimator lens is located near the light source (semiconductor laser or the like), whereby the temperature of the collimator lens is likely to rise due to the heat from the light source. As a consequence, there has been a demand for increasing the distance from the collimator lens to the light source so that the former is less likely to be influenced by the heat from the latter.

SUMMARY OF THE INVENTION

In view of the circumstances mentioned above, it is an object of the present invention to provide a collimator lens which, while in a simple lens configuration made of two groups and two elements, can favorably correct off-axis aberrations to about 2 degrees in terms of half angle of view ω and can secure required back focus.

It is another object of the present invention to provide a light-scanning apparatus using such a collimator lens.

The collimator lens in accordance with the present invention comprises, successively from a parallel luminous flux side, a first lens having a concave surface directed onto the parallel luminous flux side, and a second lens having a positive refracting power, while at least one of surfaces of the first lens is formed as an aspheric surface.

Preferably, the surface of the second lens on the light source side is a convex surface.

The surface of the first lens on the parallel luminous flux side may be a concave surface.

Preferably, the collimator lens of the present invention is configured so as to satisfy the following conditional expression (1):

$$-5.90 < R_1/f < -0.33 \qquad (1)$$

where $R_1$ is the paraxial radius of curvature of the surface of the first lens on the parallel luminous flux side; and f is the focal length of the whole lens system.

The light-scanning apparatus in accordance with the present invention uses the above-mentioned collimator lens.

Here, when the surface of the first lens on the parallel luminous flux side is an aspheric surface, the above-mentioned "concave surface" refers to a surface in which the radius of a circular arc (hereinafter referred to as "approximate radius of curvature") connecting three points consisting of a point of this aspheric surface on the optical axis and two points at end portions of an effective diameter thereof is negative.

BRIEF DESCRIPTION OF THE DRAWINGS

FIGS. 4A, 4B, and 4C-1 to 4C-5 are aberration charts (showing spherical aberration, astigmatism, and wavefront aberration) of the collimator lens in accordance with Example 1 of the present invention;

FIGS. 5A, 5B, and 5C-1 to 5C-5 are aberration charts (showing spherical aberration, astigmatism, and wavefront aberration) of the collimator lens in accordance with Example 2 of the present invention;

FIGS. 6A, 6B, and 6C-1 to 6C-5 are aberration charts (showing spherical aberration, astigmatism, and wavefront aberration) of the collimator lens in accordance with Example 3 of the present invention;

FIGS. 7A, 7B, and 7C-1 to 7C-5 are aberration charts (showing spherical aberration, astigmatism, and wavefront aberration) of the collimator lens in accordance with Example 4 of the present invention; and FIGS. 8A, 8B, and 8C-1 to 8C-5 are aberration charts (showing spherical aberration, astigmatism, and wavefront aberration) of the collimator lens in accordance with Example 5 of the present invention.

DESCRIPTION OF THE PREFERRED EMBODIMENTS

In the following, the collimator lens and light-scanning apparatus in accordance with embodiments of the present invention will be explained with reference to the accompanying drawings.

Figure 1:
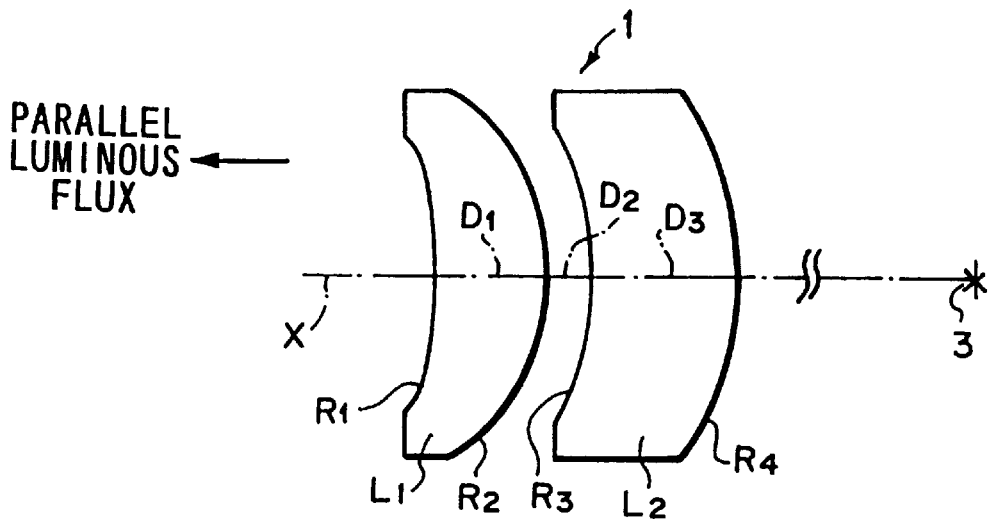
FIG. 1 is a basic lens configurational view of the collimator lens in accordance with Example 1 of the present invention.
Figure 2:
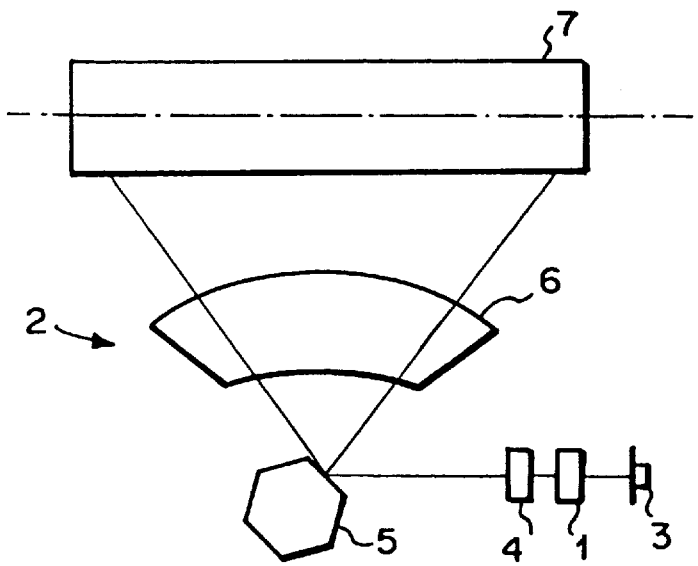
FIG. 2 is a schematic configurational view of a light-scanning apparatus using the collimator lens shown in FIG. 1.

FIG. 1 is a basic lens configurational view of the collimator lens in accordance with an embodiment of the present invention (typically representing the one corresponding to Example 1), whereas FIG. 2 is a schematic configurational view of the light-scanning apparatus using the collimator lens shown in FIG. 1.

The collimator lens 1 in accordance with the present invention is used in an optical system of a light-scanning apparatus 2 such as laser printer, copier, or the like for scanning a laser beam so as to record or display images.

In this light-scanning apparatus 2, as shown in FIG. 2, a laser beam emitted from a semiconductor laser 3 is converted into a parallel luminous flux by the collimator lens 1; the surface tilting of a polygon mirror 5 is corrected by an auxiliary optical system 4 constituted by a slit, a cylindrical lens, or the like; the laser beam is deflected by the polygon mirror 5; and a minute beam spot guided and formed onto the surface of a photoconductive photosensitive drum 7 by an fθ lens 6 is scanned on a recording medium.

As shown in FIG. 1, the collimator lens in accordance with this embodiment is a two-group, two-element lens comprising, successively from the parallel luminous flux side, a first lens $L_1$ having a concave surface directed onto the parallel luminous flux side, and a second lens $L_2$, having a positive refracting power, whose surface on the light source side is a convex surface. Also, at least one of the surfaces of the first lens $L_1$ is an aspheric surface. In FIG. 1, the surface of the first lens $L_1$ on the parallel luminous flux side is an aspheric surface. In FIG. 1, X indicates the optical axis.

Here, the aspheric surface form of the first lens $L_1$ is represented by the following aspheric surface expression. The same aspheric surface expression is used in the following Examples as well.

$$f(\rho) = \frac{\frac{\rho^2}{R}}{1 + \sqrt{1 - k\left(\frac{\rho}{R}\right)^2}} + a_4\rho^4 + a_6\rho^6 + a_8\rho^8 + a_{10}\rho^{10}$$

where $f(\rho)$ is the length (mm) of the perpendicular to the tangential plane (the plane perpendicular to the optical axis) of an apex of the aspheric surface from a point on the aspheric surface at a height $\rho$ from the optical axis;

R is the paraxial radius of curvature of the aspheric surface;

$\rho$ is the height (mm) from the optical axis;

k is the eccentricity; and $a_4$, $a_6$, $a_8$, and $a_{10}$ are the fourth, sixth, eighth, and tenth-order aspheric surface coefficients, respectively.

Also, the collimator lens 1 in accordance with this embodiment satisfies the following conditional expression (1):

$$-5.90 < R_1/f < -0.33 \tag{1}$$

where $R_1$ is the paraxial radius of curvature of the surface of the first lens $L_1$ on the parallel luminous flux side; and f is the focal length of the whole lens system.

When the above-mentioned conditional expression (1) is satisfied, the tilting of tangential image surface can favorably be corrected. When the upper limit thereof is exceeded, the tangential image surface may tilt to the over side. When the lower limit thereof is not satisfied, the tangential image surface may tilt to the under side. The image surface tilting in this embodiment is sufficiently small as compared with the prior art. Namely, its image surface tilting is not greater than the half that of a single-element collimator lens having one aspheric surface.

When the surface of the first lens $L_1$ on the parallel luminous flux side is formed as a concave surface, back focus can be made greater. When the surface of the second lens $L_2$ on the light source side is formed as a convex surface, back focus can be attained more securely.

Thus configured collimator lens 1 can yield, while in a simple lens configuration comprising two groups and two elements, a collimator lens having a wide angle of view with favorably corrected off-axis aberrations, with a certain degree of numerical aperture (approximately NA=0.25 to 0.3) being secured, and a light-scanning apparatus using the same.

The collimator lens 1 in accordance with this embodiment can also cause the luminous flux on the light source side to become nearly telecentric. Namely, since it has favorable off-axis performances, its lens properties will not deteriorate even if the light source is off the optical axis or a plurality of light sources are arranged in the vicinity of the optical axis.

By using this characteristic, the collimator lens 1 of this embodiment can be employed in a multi-beam scanning optical system in which a plurality of semiconductor lasers, as light sources, are disposed on a plane perpendicular to the optical axis. For example, in a color copier or the like, three semiconductor lasers corresponding to red, green, and blue, respectively, or four semiconductor lasers including the one for monochrome images in addition thereto, may be disposed on a plane perpendicular to the optical axis. Also, when a plurality of semiconductor lasers for monochrome images are arranged in the sub-scanning direction, the number of scanning operations can be reduced, so as to shorten the light-scanning time.

The collimator lens 1 of this embodiment can also be used as an objective lens aimed at forming an image of an object disposed on the parallel luminous flux side onto a recording medium, and collecting and scanning a laser beam at this image-forming position; or an objective lens for optical disks.

When the collimator lens 1 of this embodiment is used as such, it is desirable that the whole lens system have a focal length of 3 to 30 mm.

In the following, Examples 1 to 5 will be explained with specific numerical values.

EXAMPLE 1

As shown in FIG. 1, the collimator lens 1 in accordance with Example 1 comprises, successively from the parallel luminous flux side, a first lens $L_1$ and a second lens $L_2$, each made of a positive meniscus lens having a convex surface directed onto the light source side, in which the surface of the first lens $L_1$ on the parallel luminous flux side is formed as an aspheric surface.

The upper part of the following Table 1 shows the radius of curvature R of each lens surface, center thickness of each lens and air space between the lenses D, and refractive index N of each lens at a wavelength of 780 nm in Example 1. Here, in Table 1 and Tables 2 to 5 which will be mentioned later, each value is normalized with the focal length of the whole lens system being taken as 1, and the numbers denoting the letters R, D, and N successively increase from the parallel luminous flux side. Also, in Table 1 and Tables 2 to 5 which will be mentioned later, each surface in which "*" is attached to the left side of its surface number is an aspheric surface, whose radius of curvature R is a value of radius of curvature in the vicinity of the optical axis.

The middle part of Table 1 shows the respective values of constants k, $a_4$, $a_6$, $a_8$, and $a_{10}$ of the aspheric surface represented by the above-mentioned aspheric surface expression in Example 1.

The lower part of Table 1 shows the respective values of focal length $f_2/f$ of the second lens $L_2$, numerical aperture NA, half angle of view $\omega$, back focus Bf, effective diameter $\Phi_1$ of the surface of the first lens $L_1$ on the parallel luminous flux side, approximate radius of curvature $r_1$ of the surface of the first lens $L_1$ on the parallel luminous flux side, and $R_1/f$ of conditional expression (1) in the collimator lens 1 of Example 1.

As can be seen from Table 1, conditional expression (1) is satisfied in Example 1.

EXAMPLE 2

Figure 3:
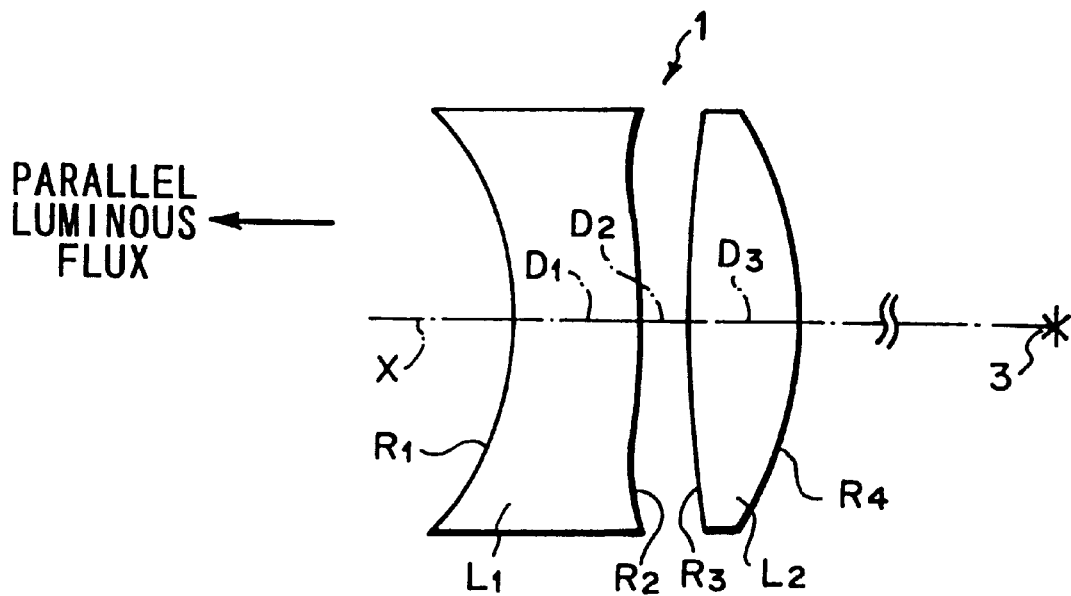
FIG. 3 is a basic lens configurational view of the collimator lens in accordance with Example 2 of the present invention.
Figure 4A:
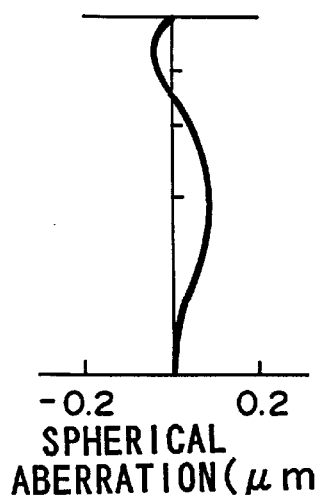
Figure 4B:
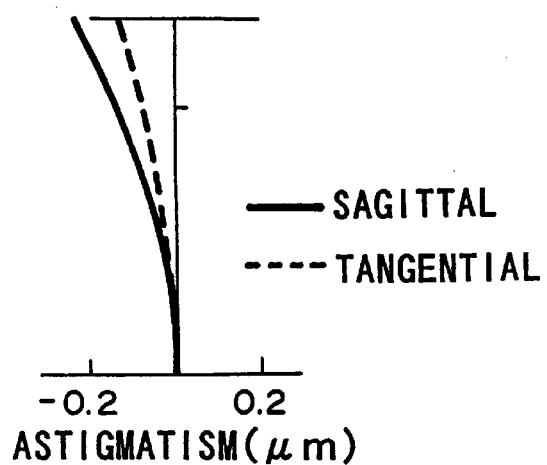
Figures 1, 4C:
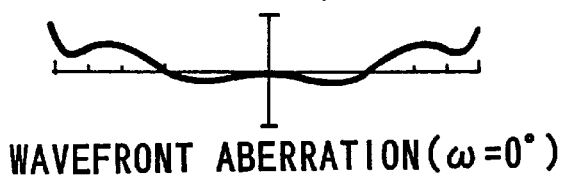
Figures 2, 4C:
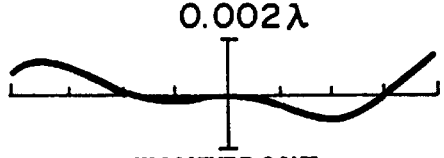
Figures 3, 4C:
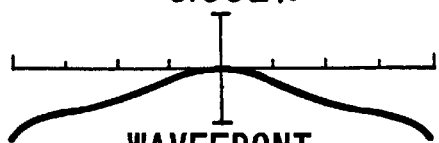
Figures 4, 4C:
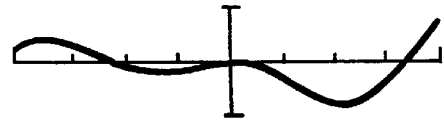
Figures 4, 4C, 5:
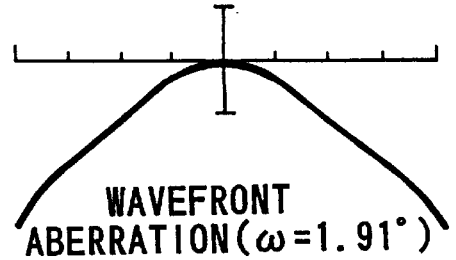
Figure 5A:
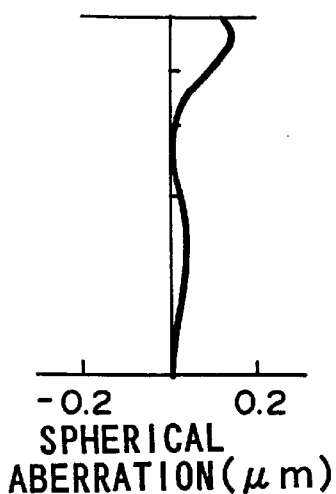
Figure 5B:
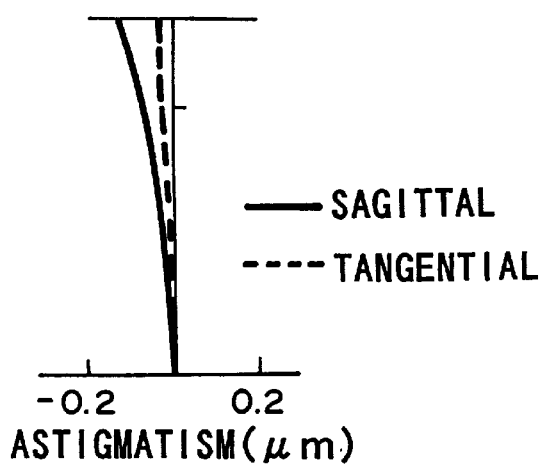
Figures 1, 5C:
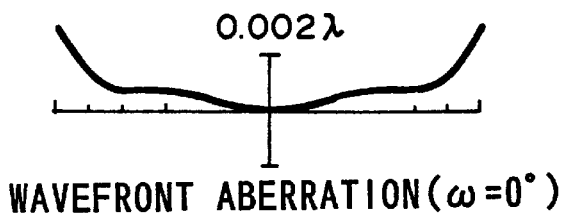
Figures 2, 5C:
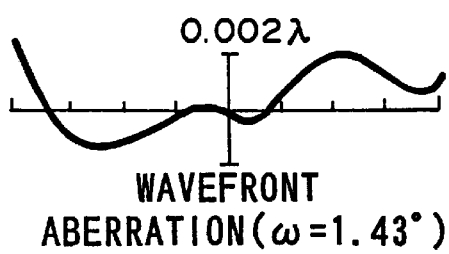
Figures 3, 5C:
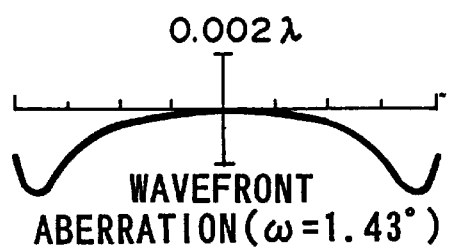
Figures 4, 5C:
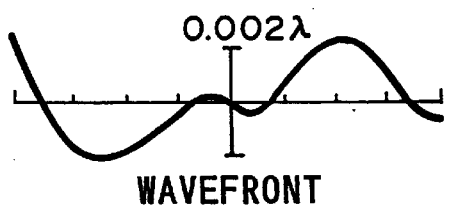
Figures 5, 5C:
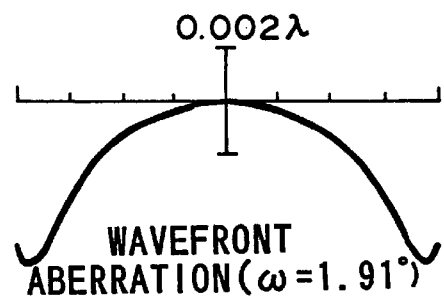
Figure 8A:
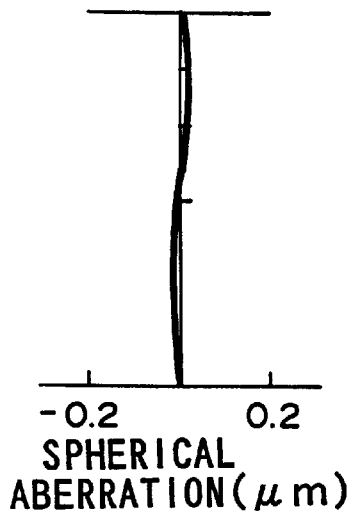
Figure 8B:
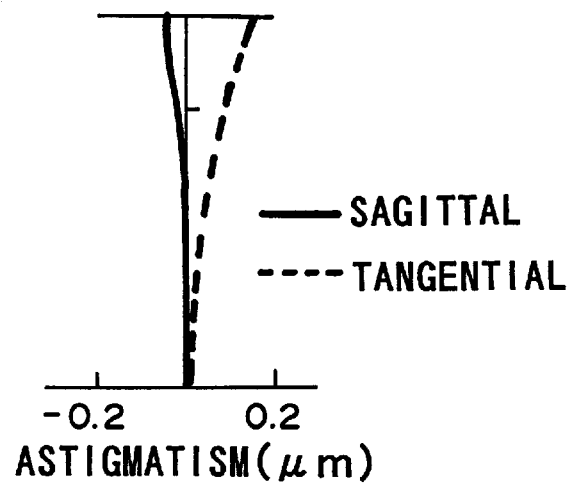
Figures 1, 8C:
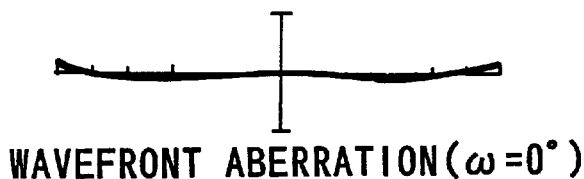
Figures 2, 8C:
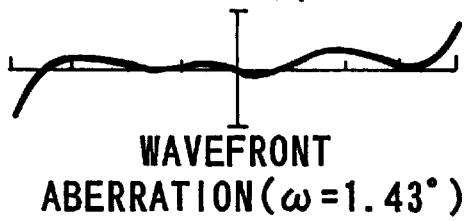
Figures 3, 8C:
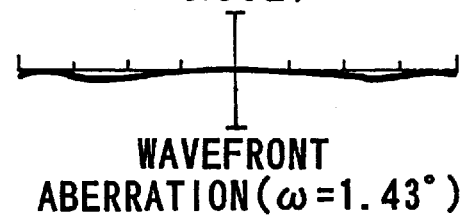
Figures 4, 8C:
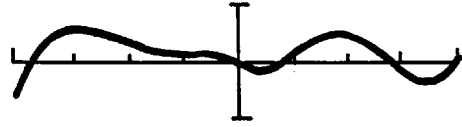
Figures 5, 8C:
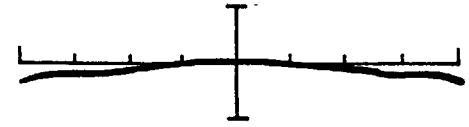

As shown in FIG. 3, the collimator lens 1 in accordance with Example 1 comprises, successively from the parallel luminous flux side, a first lens $L_1$ made of a negative meniscus lens having a convex surface directed onto the light source side, and a second lens $L_2$ made of a biconvex lens having a surface with a greater curvature directed onto the light source side, while the surface of the first lens $L_1$ on the light source side is formed as an aspheric surface.

The upper part of the following Table 2 shows the radius of curvature R of each lens surface, center thickness of each lens and air space between the lenses D, and refractive index N of each lens at a wavelength of 780 nm in Example 2.

The middle part of Table 2 shows the respective values of constants k, $a_4$, $a_6$, $a_8$, and $a_{10}$ of the aspheric surface represented by the above-mentioned aspheric surface expression in Example 2.

The lower part of Table 2 shows the respective values of focal length $f_2/f$ of the second lens $L_2$, numerical aperture NA, half angle of view $\omega$, back focus Bf, and $R_1/f$ of conditional expression (1) in the collimator lens 1 of Example 2.

As can be seen from Table 2, conditional expression (1) is satisfied in Example 2.

EXAMPLE 3

The collimator lens 1 in accordance with Example 3 has a configuration substantially the same as that of Example 2 except that both surfaces of the first lens $L_1$ are made aspheric.

The upper part of the following Table 3 shows the radius of curvature R of each lens surface, center thickness of each lens and air space between the lenses D, and refractive index N of each lens at a wavelength of 780 nm in Example 3.

The middle part of Table 3 shows the respective values of constants k, $a_4$, $a_6$, $a_8$, and $a_{10}$ of each aspheric surface represented by the above-mentioned aspheric surface expression in Example 3.

The lower part of Table 3 shows the respective values of focal length $f_2/f$ of the second lens $L_2$, numerical aperture NA, half angle of view $\omega$, back focus Bf, effective diameter $\Phi_1$ of the surface of the first lens $L_1$ on the parallel luminous flux side, approximate radius of curvature $r_1$ of the surface of the first lens $L_1$ on the parallel luminous flux side, and $R_1/f$ of conditional expression (1) in the collimator lens 1 of Example 3.

As can be seen from Table 3, conditional expression (1) is satisfied in Example 3.

EXAMPLE 4

The collimator lens 1 in accordance with Example 4 has a configuration substantially the same as that of Example 1 except that the surface of the first lens L1 on the parallel luminous flux side is made aspheric. Also, in Example 4, the light source side is configured telecentric.

The upper part of the following Table 4 shows the radius of curvature R of each lens surface, center thickness of each lens and air space between the lenses D, and refractive index N of each lens at a wavelength of 780 nm in Example 4.

The middle part of Table 4 shows the respective values of constants k, $a_4$, $a_6$, $a_8$, and $a_{10}$ of the aspheric surface represented by the above-mentioned aspheric surface expression in Example 4.

The lower part of Table 4 shows the respective values of focal length $f_2/f$ of the second lens $L_2$, numerical aperture NA, half angle of view $\omega$, back focus Bf, effective diameter $\Phi_1$ of the surface of the first lens $L_1$ on the parallel luminous flux side, approximate radius of curvature $r_1$ of the surface of the first lens $L_1$ on the parallel luminous flux side, and $R_1/f$ of conditional expression (1) in the collimator lens 1 of Example 4.

As can be seen from Table 4, conditional expression (1) is satisfied in Example 4.

EXAMPLE 5

The collimator lens 1 in accordance with Example 5 has a configuration substantially the same as that of Example 3 except that the second lens $L_2$ is made of a biconvex lens having a surface with a larger curvature directed onto the parallel luminous flux side.

The upper part of the following Table 5 shows the radius of curvature R of each lens surface, center thickness of each lens and air space between the lenses D, and refractive index N of each lens at a wavelength of 780 nm in Example 5.

The middle part of Table 5 shows the respective values of constants k, $a_4$, $a_6$, $a_8$, and $a_{10}$ of the aspheric surface represented by the above-mentioned aspheric surface expression in Example 5.

The lower part of Table 5 shows the respective values of focal length $f_2/f$ of the second lens $L_2$, numerical aperture NA, half angle of view $\omega$, back focus Bf, effective diameter $\Phi_1$ of the surface of the first lens $L_1$ on the parallel luminous flux side, approximate radius of curvature $r_1$ of the surface of the first lens $L_1$ on the parallel luminous flux side, and $R_1/f$ of conditional expression (1) in the collimator lens 1 of Example 5.

As can be seen from Table 5, conditional expression (1) is satisfied in Example 5.

FIGS. 4 to 8 shows the respective aberration charts (each showing spherical aberration, astigmatism, and wavefront aberration) of the collimator lenses in accordance with Examples 1 to 5. Each aberration chart refers to the state where a glass plate having a thickness of 0.417 (with a refractive index of 1.51) is included on the light source side. In each aberration chart, $\omega$ indicates the half angle of view. Also, each astigmatism chart shows aberrations with respect to sagittal (S) and tangential (T) image surfaces.

As can be seen from FIGS. 4 to 8, all kinds of aberration can be made favorable according to each of the above-mentioned Examples.

Without being restricted to the above-mentioned Examples, the collimator lens of the present invention can be modified in various modes. For example, values of radius of curvature R and lens space (or lens thickness) D can be modified as required.

The collimator lens in accordance with the present invention comprises, successively from a parallel luminous flux side, a first lens having a concave surface directed onto the parallel luminous flux side, and a second lens having a positive refracting power, while at least one of surfaces of the first lens is formed as an aspheric surface. As a consequence, the collimator lens in accordance with the present invention and the light-scanning apparatus using the same, while in a simple lens configuration made of two groups and two elements, can favorably correct off-axis aberrations to about 2 degrees in terms of half angle of view $\omega$ and can secure required back focus, while keeping a certain degree of numerical aperture (approximately NA=0.25 to 0.3).

TABLE 1

Example 1

| Surface | R | D | N |
|---|---|---|---|
| *1 | −1.3759 | 0.2741 | 1.58252 |
| 2 | −0.4565 | 0.0989 | |
| 3 | −0.6571 | 0.3525 | 1.78569 |
| 4 | −0.6571 | | |
| k | | $1.0917 \times 10^0$ | |
| $a_4$ | | $3.0270 \times 10^0$ | |
| $a_6$ | | $1.1606 \times 10^1$ | |
| $a_8$ | | $4.9013 \times 10^0$ | |
| $a_{10}$ | | $-6.3907 \times 10^2$ | |
| $f_2/f$ | | 3.5421 | |
| NA | | 0.25 | |
| $\omega$ | | 1.91 | |
| Bf | | 0.9972 | |
| $\phi_1$ | | 0.50 | |
| $r_1$ | | −0.8358 | |
| $R_1/f$ | | −1.38 | |

TABLE 2

Example 2

| Surface | R | D | N |
|---|---|---|---|
| 1 | −0.6877 | 0.3135 | 1.58252 |
| *2 | −1.7161 | 0.1235 | |
| 3 | 3.0598 | 0.2833 | 1.80331 |
| 4 | −0.8809 | | |
| k | | $9.7155 \times 10^1$ | |
| $a_4$ | | $8.3482 \times 10^1$ | |
| $a_6$ | | $1.3430 \times 10^0$ | |

TABLE 2-continued

Example 2

| Surface | R | D | N |
|---|---|---|---|
| $a_8$ | | $3.6635 \times 10^0$ | |
| $a_{10}$ | | $-7.2133 \times 10^0$ | |
| $f_2/f$ | | 0.8839 | |
| NA | | 0.3 | |
| $\omega$ | | 1.91 | |
| Bf | | 1.2103 | |
| $R_1/f$ | | −0.69 | |

TABLE 3

Example 3

| Surface | R | D | N |
|---|---|---|---|
| *1 | −0.5519 | 0.3833 | 1.58252 |
| *2 | −1.0551 | 0.0333 | |
| 3 | 2.4261 | 0.3000 | 1.80331 |
| 4 | −1.0687 | | |
| 1st Surface | k | $8.4123 \times 10^{-1}$ | 2nd Surface | k | $6.0296 \times 10^{-1}$ |
| | $a_4$ | $-1.9641 \times 10^{-1}$ | | $a_4$ | $3.5172 \times 10^{-1}$ |
| | $a_6$ | $1.6301 \times 10^0$ | | $a_6$ | $1.1277 \times 10^0$ |
| | $a_8$ | $5.3027 \times 10^0$ | | $a_8$ | $1.6964 \times 10^0$ |
| | $a_{10}$ | $5.2189 \times 10^0$ | | $a_{10}$ | $-1.0936 \times 10^{-1}$ |
| $f_2/f$ | | 0.9634 | |
| NA | | 0.30 | |
| $\omega$ | | 1.91 | |
| Bf | | 0.8933 | |
| $\phi_1$ | | 0.60 | |
| $r_1$ | | −0.5587 | |
| $R_1/f$ | | −0.55 | |

TABLE 4

Example 4

| Surface | R | D | N |
|---|---|---|---|
| *1 | −4.0000 | 0.4667 | 1.58252 |
| 2 | −0.8217 | 0.0333 | |
| 3 | −1.7083 | 0.3420 | 1.80331 |
| 4 | −0.9020 | | |
| k | | $1.0002 \times 10^0$ | |
| $a_4$ | | $-1.2630 \times 10^0$ | |
| $a_6$ | | $-1.8459 \times 10^0$ | |
| $a_8$ | | $-3.8262 \times 10^0$ | |
| $a_{10}$ | | $-1.4781 \times 10^1$ | |
| $f_2/f$ | | 2.0104 | |
| NA | | 0.25 | |
| $\omega$ | | 1.91 | |
| Bf | | 0.9695 | |
| $\phi_1$ | | 0.50 | |
| $r_1$ | | −2.3603 | |
| $R_1/f$ | | −4.00 | |

TABLE 5

Example 5

| Surface | R | D | N |
|---|---|---|---|
| *1 | −0.3667 | 0.3461 | 1.58252 |
| *2 | −0.6188 | 0.0333 | |
| 3 | 1.4805 | 0.2500 | 1.80331 |
| 4 | −1.7768 | | |
| 1st Surface | k | $3.4425 \times 10^{-1}$ | 2nd Surface | k | $5.8653 \times 10^{-1}$ |
| | $a_4$ | $9.8585 \times 10{-2}$ | | $a_4$ | $3.8629 \times 10^{-1}$ |
| | $a_6$ | $4.3248 \times 10^0$ | | $a_6$ | $1.4335 \times 10^0$ |
| | $a_8$ | $1.8941 \times 10^1$ | | $a_8$ | $2.1498 \times 10^0$ |

TABLE 5-continued

Example 5

| Surface | R | D | N |
|---|---|---|---|
| | $a_{10}$ 1.5282 × 10² | | $a_{10}$ 1.4730 × 10¹ |
| $f_2/f$ | | 1.0456 | |
| NA | | 0.25 | |
| ω | | 1.91 | |
| Bf | | 0.9336 | |
| $\phi_1$ | | 0.50 | |
| $r_1$ | | −0.4025 | |
| $R_1/f$ | | −0.37 | |

What is claimed is:

1. A collimator lens comprising, successively from a parallel luminous flux side, a first lens having a concave surface directed onto the parallel luminous flux side, and a second lens having a positive refracting power, wherein at least one of surfaces of said first lens if formed as an aspheric surface, and wherein collimated light is emitted from the luminous flux side.

2. A collimator lens according to claim 1, wherein the surface of said second lens on a light source side is a convex surface.

3. A collimator lens according to claim 2, wherein the surface of said first lens on the parallel luminous flux side is a concave surface.

4. A collimator lens according to claim 1, wherein said collimator lens satisfies the following conditional expression (1):

$$-5.90 < R_1/f < -0.33 \tag{1}$$

where $R_1$ is the paraxial radius of curvature of the surface of the first lens on the parallel luminous flux side; and f is the focal length of the whole lens system.

5. A light-scanning apparatus using the collimator lens of claim 1.

6. A collimator lens consisting, successively from a parallel luminous flux side, a first lens having a concave surface directed onto the parallel luminous flux side, and a second lens having a positive refracting power, wherein at least one of surfaces of said first lens is formed as an aspheric surface, and wherein collimated light is emitted from the luminous flux side.

* * * * *

UNITED STATES PATENT AND TRADEMARK OFFICE
CERTIFICATE OF CORRECTION

PATENT NO. : 6,061,183
DATED : May 9, 2000
INVENTOR(S) : Yoko Nakai

Page 1 of 1

It is certified that error appears in the above-identified patent and that said Letters Patent is hereby corrected as shown below:

Column 9,
Line 21, please delete the word "if" and substitute therefore --- is ---.
Line 22, after "emitted from the" insert --- parallel ---.

Column 10,
Line 21, after "emitted from the" insert --- parallel ---.

Signed and Sealed this

Twenty-first Day of August, 2001

Attest:

*Nicholas P. Godici*

NICHOLAS P. GODICI
*Attesting Officer*     *Acting Director of the United States Patent and Trademark Office*